United States Patent Office 3,172,898
Patented Mar. 9, 1965

3,172,898
PROCESS FOR PREPARATION OF METAL
CHELATES OF AMINOPOLYCARBOXYLIC
ACID COMPOUNDS
Charles Elmer Wymore, Midland, Mich., assignor to The
Dow Chemical Company, Midland, Mich., a corporation of Delaware
No Drawing. Filed Feb. 19, 1962, Ser. No. 174,282
5 Claims. (Cl. 260—439)

This invention is concerned with metal chelates and particularly with improved methods for the preparation of metal chelates of aminopolycarboxylic acid compounds.

Metal chelates have proved to be a highly desirable form for administering chelatable metals in industrial, agricultural and medical applications where slow or controlled release is needed. Because of their solubility, these organometallic or metalorganic complexes have been useful for supplying metals under conditions where metal supplied by other means may be rendered insoluble or unavailable. One important application of water-soluble metalorganic complexes is for supplying cationic trace elements essential for adequate plant growth such as Fe, Mn, Zn, Cu, etc. These metalorganic complexes or chelates are usually supplied to soil or plant growth medium, with or without fertilizers. In certain areas, the soil is heavy and compact rendering impractical application of trace mineral in soil. In such situations, foliar application is frequently employed, i.e., compositons containing metal chelates are sprayed on the plants. Such operations have provided a suitable means for providing the necessary trace metals but have been accompanied by undesirable side effects such as burning or spotting of leaves. The undesirable side effects appear to be attributable to by-products present in metalorganic complex compositions obtained by currently employed production methods. Purified metal chelates may also be useful as mineral suplement for animal nutrition. Thus, purified cobalt metal chelate may conveniently be supplied with animal feed as mineral supplements. Nickel metal chelate may be employed in special electroplating bath compositions.

It is an object of the present invention to provide improved methods for the preparation of metal chelates of aminopolycarboxylic acid compounds which methods produce compositions which are substantially free of biologically harmful impurities. It is further an object of the invention to provide methods for the preparation of metal chelates of aminopolycarboxylic acid compounds in a purer state than has heretofore been possible. An additional object is to provide methods which obviate cumbersome purification procedures. Still another object is to provide methods which will produce compositions of metal chelates having higher content of metal. Other objects will become evident from the following specification and claims.

According to the present invention, it has been discovered that metal chelates of aminopolycarboxylic acid compounds of greater purity, of higher metal content and in which biologically harmful impurities have been substantially reduced may be prepared without need for extensive purification procedures in a process which comprises (1) contacting an aqueous solution of a water-soluble salt of a chelatable metal with a strongly acidic cation exchange resin such as a sulfonic acid cation exchange resin to exchange thereon a chelatable metal cation, (2) contacting said resin bearing said chelatable metal with an aminopolycarboxylic acid chelating agent to produce the desired metal chelate of said aminopolycarboxylic acid and (3) recovering said metal chelate from the resin surface by washing or eluting with water.

By the expression "aminopolycarboxylic acid compounds" is meant a group of organic chelating agents well known in the art which compounds are characterized by having at least one amino group and at least two carboxyl groups. These compounds may be prepared, for example, by reacting ammonia, or mono-, di- or polyamines with halogenated carboxylic acids such as chloroacetic, chloropropionic and substituted chloroacetic and chloropropionic acids. Examples of aminopolycarboxylic acid compounds are ethylenediaminetetraacetic acid, N-(2-hydroxyethyl)ethylenediaminetriacetic acid, iminodiacetic acid, N-(2-hydroxyethyl)iminodiacetic acid, nitrilotriacetic acid, diethylenetriaminepentaacetic acid and ethylenediamine - N,N' - bis(2-hydroxyphenylglycine). While the compounds have been named in terms of the free acids, the expression is meant to include water-soluble salts, especially ammonium and alkali metal salts.

By the expression "salt of a chelatable metal" as herein employed is meant an inorganic salt of a metal which metal is capable of forming polydentate chelates with aminopolycarboxylic acid compounds. It is meant to embrace water-soluble salts of metals known to form chelate complexes and which has an equilibrium constant in the following equation

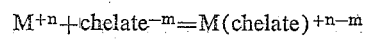

$$M^{+n} + \text{chelate}^{-m} = M(\text{chelate})^{+n-m}$$

of $1 \times 10^4$ or greater. The constant is an index of the stability of the chelate. Examples of a salt of a chelatable metal include ferric chloride, manganous chloride, zinc chloride, zinc sulfate, zinc nitrate, manganous sulfate, cupric chloride, cupric sulfate, cobalt chloride, cobalt nitrate, nickel chloride and nickel sulfate.

By the expression "sulfonic acid cation exchange resin" is meant a polymeric material having the capacity to exchange ions with the surrounding medium through the —SO₃H or similar group in which the hydrogen has been replaced by another cation such as sodium or other alkali metal or ammonium. The exchange resin may be completely synthetic and have polymeric skeleton such as phenolformaldehyde resins, polystyrene or other poly (vinylaryl) compounds crosslinked with from about 2 to 20 mole percent of a compound, such as divinylbenzene, having two unconjugated vinylidene groups, and the like. The exchange resin may also be those of natural materials which have been modified by chemical treatment such as sulfonated coal. Particularly suitable for the process are Dowex 50 resins, cation exchange resins of polystyrene nuclear sulfonic acid type and available commercially in both the hydrogen and sodium form and further available with varying degrees of cross-linkage and designated, for example, as X4 for 4% cross-linked. The preferred mesh size of the resin when employing the column method as hereinafter described is about 50–100. The mesh size is not important when employing batch procedure.

In carrying out the first step of the reaction, a dilute aqueous solution of the appropriate salt of a chelatable metal is passed through a column containing a strongly acidic cation exchange resin preferably of the sulfonic acid type. The cation exchange resin is preferably in the salt form although the hydrogen form may be employed and in certain instances such as in the case where the chelating agent composition in the second step is strongly basic, the latter is preferred. Although the monovalent cation exchanged on the resin to be employed is not critical, commercially available cation exchange resins of the salt form have sodium exchanged thereon, thus this is a convenient form. Furthermore, in converting the hydrogen form to the salt form, sodium hydroxide is considered most practical from the economic standpoint; thus, again the salt form is conveniently sodium. The concentration of the aqueous solution of the salt of chelatable metal is determined primarily from a practical consideration, such concentration being employed that will provide the greatest efficiency of exchange. The concentration range considered most suitable was from about 0.1 to about 0.15 molar solution. It is to be understood however that higher or lower concentrations may be employed, although concentrations higher than 0.25 molar are not as efficient as the lower concentration. The rate of flow of the solution is not critical; however, a rate of from about 1 to about 10 gallons per minute per square foot of bed is judged desirable. As a result of the above operations, the chelatable metal displaces the alkali metal or hydrogen on the cation exchange resin to produce a resin having a chelatable metal exchanged thereon; such resin may be designated as being in the "chelatable metal form." Although the resin may be substantially completely converted to the chelatable metal form, this usually necessitates treating the resin with an excess of the salt of chelatable metal and is not considered necessary. It is necessary that at least such amounts of the chelatable metal be exchanged on the resin as the amount of aminopolycarboxylic acid chelating agent which is intended to be employed in the subsequent step. It is desirable to have the resin at least 75 percent in the chelatable metal form.

In carrying out the second step of the reaction, the resin in the chelatable metal form is contacted with the appropriate aminopolycarboxylic acid chelating agent by passing an aqueous solution thereof through the resin bed whereupon a reaction takes place with the formation of the desired metal chelate. The latter generally remains on the surfaces or interstices of the resin particles when no excess of chelating agent solution is employed. The exact concentration of the aqueous solution is not critical but a solution containing from about 8 to about 20 percent by weight of the chelating agent is desirable. The process may be carried out successfully in such concentrations as to provide 1 mole of chelating agent per mole of metal on the resin in such volume of water equal to the volume of resin to be treated. The solution of the chelating agent may be in the acid or salt form, depending in part on the form of the chelate product desired. The most desirable flow rate depends in part on the size of the column; for columns of from 3 to 4 centimeters in diameter the flow may vary from about 0.1 to 2 gallons per minute per square foot of column area.

As the third step of the reaction, water is allowed to percolate through the resin bed bearing the metal chelate of an aminopolycarboxylic acid to wash off or elute the metal chelate from the surfaces of the resin and to recover same in the aqueous effluent. The effluent may then be adjusted to the proper pH by addition of alkali or acid to obtain the chelate in the desired acid or salt form. In many cases, the aqueous solution of the metal chelate thus obtained is suitable for use without additional change. When the chelate product is desired in the solid form, the solid may be recovered by evaporating off the water. Further purification may be carried out according to procedures conventional in the art.

In an alternative and preferred procedure for the preparation of a metal chelate, the process is carried out in a reactor in a "batch process." A reactor suitable for carrying out the batch process is one fitted at the bottom with a screen and valved port; a reactor so fitted can serve the function of a column as well as a reactor. In this process, the appropriate cation exchange resin as above described and the aqueous metal salt solution are agitated in the reactor to obtain efficient reaction with the metal salt solution. The concentration of the salt solution may vary within the same range as the column process. The time required for agitating the components together depends on the size of the batch and the efficiency of agitation. A period of from about 0.5 to 24 hours is satisfactory. At the end of this period, the waste liquor is removed through the screen and the valved port, the loaded resin washed and the port closed to carry out the second step of the reaction.

An aqueous solution of an appropriate aminopolycarboxylic acid is added to the reactor. The preferred concentration is from about 10 to 20 percent by weight of aminopolycarboxylic acid. In carrying out this step, the components are allowed to remain in contact in the mixture for from about 0.25 to about 50 hours while the temperature is in the range of from about 15° C. to about 100° C. Preferably, the mixture is heated on a steam bath for from 1 to 4 hours or more. Longer reaction times are required if a highly cross-linked resin is employed. During the appropriate period of contact and/or heating, a reaction takes place with the formation of a metal chelate of an aminopolycarboxylic acid compound. The metal chelate thus formed may be in the neutral salt form or the acid form or a mixture thereof. Factors influencing the nature of the product include the nature of the aminopolycarboxylic acid compound employed as reactant, i.e., salt form or acid form, presence or absence of caustic (frequently present in commercial samples of aminopolycarboxylic acids, especially in aqueous solutions of same, the form of the ion-exchange resin employed in step 1 (acid or salt form), and the relative acidity or basicity of the chelate complex with respect to the resin and other components in the reaction medium. In a modified procedure, particularly when a highly alkaline salt solution of chelating agent is employed, a sufficient amount of the acid form of the chelating agent may be added to the reaction mixture. The metal chelate product resulting from the foregoing operations remains physically adsorbed on the surfaces and interstices of the resin. The aqueous waste liquor is then removed from the reactor through the lower port and the chelate recovered from the resin as the third step of the reaction.

The third step is carried out as in the column procedure, the bottom portion of the reactor serving as a column. Water is allowed to percolate through the resin in the reactor to eluate the metal chelate and to recover the chelate in the effluent as previously described.

In a further preferred method for carrying out the reaction for the preparation of a metal chelate of an aminopolycarboxylic acid compound, an aqueous inorganic salt solution of a chelatable metal is passed through a column of a sulfonic acid cation exchange resin in the salt form. Thereafter, the resin is removed from the column and heated with an aminopolycarboxylic acid chelating agent for a period of several hours' The resin is then removed from the reaction mixture, placed in a column and washed with water to obtain in the effluent the desired metal chelate product of an aminopolycarboxylic acid compound.

The following examples illustrate the invention but are not to be construed as limiting:

*Example 1*

A 3.44 centimenter diameter column was packed with 233 milliliters (314 milliequivalents) of the sodium form of Dowex 50–X4 (50-100 mesh) cation exchange resin. About 555 milliliters of 0.15 molar ferric chloride solution (supplying 83.3 millimoles of ferric chloride) was percolated through the column to convert 80 percent of the resin to the ferric form. The resulting resin was removed from the column and mixed with 69.4 grams of an aqueous solution containing 83.3 millimoles of trisodium N-(2-hydroxyethyl)ethylenediamine-triacetate and the resulting mixture heated at about 100° C. for two hours with occasional stirring. At the end of this period, the resin was removed from the mixture and transferred back to the column and therefore eluated with water to recover in the effluent a ferric chelate of N-(2-hydroxyethyl) ethylenediaminetriacetic acid compound. Sodium hydroxide was added to the aqueous solution until the pH of the mixture was 6.5. The water was then evaporated off and the residue dried at 110° C. in a vacuum oven at reduced pressure to obtain 34.98 grams of sodium ferric N-(2-hydroxyethyl)ethylenediominetriacetate. The latter contained 14.26 percent iron as determined by digesting the complex with $H_2SO_4$—$HNO_3$ mixture, destroying excess $HNO_3$ and titrating the ferric ion with dichromate ion.

*Example 2*

Sulfonic acid cation exchange resin (sodium form) was converted to the ferric form in the manner described in Example 1. The resin thus prepared was removed from the column and mixed with 76.6 grams of a commercial aqueous solution of 83.3 millimoles of tetrasodium ethylenediaminetetraacetate and 1.96 grams of ethylenediaminetetraacetic acid (to neutralize caustic therein), and the resulting mixture heated on a steam bath for three hours. At the end of this period, the resin was transferred to a column and eluated with water to obtain an aqueous effluent which was evaporated to dryness; the residue remaining from these operations was dried at 100° C. in a vacuum oven to obtain 36.58 grams of a ferric chelate of ethylenediaminetetraacetic acid as disodium ferric ethylenediaminetetraacetate. The product contained 13.12 percent iron as determined by digestion and titration as in Example 1.

*Example 3*

In an operation carried out in a manner similar to that described in Example 1, about 890 milliliters of 0.15 molar ferric chloride solution was percolated through 200 milliliters (about 400 milliequivalents) of Dowex 50-X8 (8% cross-linked) resin to convert the resin to a predominantly ferric form. 111 grams of an aqueous solution of 133 milliequivalents of trisodium N-(2-hydroxyethyl)ethylenediaminetriacetate was mixed with the resin above prepared and heated for 48 hours to obtain a ferric chelate N-(2-hydroxyethyl)ethylenediaminetriacetic acid compound which after elution from the column and recovery was found to contain 13.8 percent iron as determined by digestion and titration.

*Example 4*

22:5 grams (83.3 millimoles) of ferric chloride hexahydrate is dissolved in about 555 milliliters of water to produce an approximately 0.15 molar ferric chloride solution. The latter is applied to the top of a column of 233 milliliters of the sodium form of Dowex 50-X4 resin and allowed to percolate therethrough to convert the resin into a predominantly ferric form. The resulting resin is then removed from the column, heated for about 2 hours with 104 grams of an aqueous solution containing 83.3 millimoles of pentasodium diethylenetriaminepentaacetate to produce the ferric chelate complex of diethylenetriaminepentaacetic acid compound. The complex is then washed off the resin with water and the aqueous solution evaporated to dryness to recover the complex as disodium ferric diethylenetriaminepentaacetate having a molecular weight of 492.

*Example 5*

A Dowex 50-X4 resin column bearing predominantly ferric ion exchanged thereon is prepared as described in Example 4. The resulting resin is removed from the column and heated with 21.4 grams (83.3 millimoles) of trisodium nitrilotriacetate in about 50 milliliters of water for about 2 hours to obtain a ferric chelate complex of nitrilotriacetic acid compound. The complex is then washed off the resin with water and the aqueous solution evaporated to dryness to recover the complex as ferric nitrilotriacetate having a molecular weight of 244.

*Example 6*

In a manner similar to that previously described, an aqueous solution of 27.8 grams (125 millimoles) of manganese sulfate tetrahydrate in about 600 milliliters of water is percolated through 233 milliliters of the sodium form of Dowex 50-X4 (50-100 mesh) to convert the cation exchange resin to approximately 80 percent in the manganese form. The resulting resin is heated on a steam bath with aqueous solution containing 125 millimoles of tetrasodium ethylenediaminetetraacetate for about 3 hours to produce a manganous chelate complex of ethylenediaminetetraacetic acid compound. The chelate is eluted from the resin with water and the aqueous effluent evaporated to dryness to recover as residue the chelate as disodium manganese ethylenediaminetetraacetate having a molecular weight of 389 and a manganese content of 14 percent.

*Example 7*

In a similar manner, an aqueous solution of 33 grams (125 millimoles) of zinc sulfate heptahydrate in about 600 milliliters of water is percolated through 233 milliliters of the sodium form of Dowex 50-X4 resin to convert the resin to approximately 80 percent in the zinc form. The resulting resin is heated on a steam bath with an aqueous solution containing 125 millimoles of tetrasodium ethylenediaminetetraacetate for several hours to obtain a zinc chelate of ethylenediaminetetraacetic acid compound. The chelate is eluted with water and the aqueous effluent evaporated to dryness to obtain the chelate as disodium zinc ethylenediaminetetraacetate having a molecular weight of 399 and a zinc content of 16 percent.

*Example 8*

A 3.44 centimeter diameter column was packed with 233 milliliters of Dowex 50-X4 resin in the sodium form and the resin converted to the ferric form as described in Example 1. 153 milliliters of an aqueous solution containing 83.3 millimoles of trisodium N-(2-hydroxyethyl)ethylenediaminetriacetate was mixed with 100 milliliters of water and the resulting solution was passed through the column at a flow rate of approximately 0.5 gallon per minute per square foot of column to obtain on the surfaces of the resin a ferric chelate of the N-(2-hydroxyethyl)ethylenediaminetriacetic acid compound. The column was then washed with water and the effluent collected until the effluent liquid coming off the column no longer had the red color of the ferric complex. Thereafter, the pH of the solution was adjusted to 6.5 with 0.1 normal (0.1 N) sodium hydroxide solution to obtain a sodium ferric N-(2-hydroxyethyl)ethylenediaminetriacetate product. The solution was then evaporated to apparent dryness and then dried for 24 hours at 110° C. in a vacuum oven to recover 33.12 grams of a solid product having an iron content of 10.2 percent as determined by polarographic methods.

*Example 9*

In an operation carried out in a manner similar to that described in Example 8, a jacketed column bearing the ferric form of Dowex 50-X4 resin was prepared and 203 milliliters of an aqueous solution containing 83.3 millimoles of trisodium N-(2-hydroxyethyl)ethylenediaminetriacetate was passed through the resin bed maintained at 75° C. to obtain the ferric chelate of the N-(2-hydroxyethyl)ethylenediaminetriacetic acid compound. The column was then washed with water and the effluent adjusted to pH of 6.5 by the addition of 8.5 milliliters of 0.1 N sodium hydroxide solution. The yield of the sodium ferric N-(2-hydroxyethyl)ethylenediaminetriacetate product after evaporating off the water and drying as above described was 33.68 grams. The product had an iron content of 9.2 percent by polarographic determination.

*Example 10*

An operation was carried out in a similar manner employing a more dilute solution of chelating agent and a slower flow rate. 353 milliliters of an aqueous solution containing 83.3 millimoles of sodium N-(2-hydroxyethyl) ethylenediaminetriacetate was percolated through the column at a flow rate of about 0.16 gallon per minute per square foot of column area to obtain the ferric chelate of N-(2-hydroxyethyl)ethylenediaminetriacetic acid compound. The effluent was neutralized to pH 6.5 with 48.8 milliliters of 0.1 N sodium hydroxide solution and thereafter evaporated to dryness and further dried to obtain 34.2 grams of a sodium ferric N-(2-hydroxyethyl)ethylenediaminetriacetate compound. The latter had an iron content of 9.5 percent as determined by polarographic methods.

*Example 11*

In a similar operation, 233 milliliters (314 milliequivalents) of 50–100 mesh Dowex 50–X4 resin in the hydrogen form is agitated with an aqueous ferric chloride solution prepared by dissolving 22.5 grams (83.3 millimoles) of ferric chloride hexahydrate in 550 milliliters of water to convert the resin into a predominantly ferric form. The waste liquor is drained from the resin and the resin warmed at about 60° C. with 153 milliliters of an aqueous solution containing 83.3 millimoles of trisodium N-(2-hydroxyethyl)ethylenediaminetraacetate for several hours to obtain on the surfaces of the resin a ferric chelate of N-(2-hydroxyethyl)ethylenediaminetriacetic acid compound. The waste liquor is again drained and the resin is then eluted with water and the effluent collected until the liquid ceases to have the red color of the ferric complex. The water is removed from the effluent in a manner previously described to obtain a mixture of sodium and hydrogen ferric N-(2-hydroxyethyl)ethylenediaminetriacetate. The solution is acidified with dilute hydrochloric acid to pH 1 to convert the chelate into the acid form. The acid chelate product is washed with water and dried to obtain hydrogen ferric N-(2-hydroxyethyl)ethylenediaminetriacetate having a molecular weight of 331.

*Example 12*

In a similar operation, 233 milliliters of Dowex 50–X4 resin in the sodium form and about 600 milliliters of an aqueous solution containing 125 millimoles of zinc chloride are mixed together and mechanically agitated for about 2 hours to convert the resin into a predominantly zinc form. The waste liquor is then drained from the resin and the resin warmed at about 90° C. for about 2 hours with an aqueous solution containing 125 millimoles of pentasodium diethylenetriaminepentaacetate to obtain a zinc chelate complex. The complex is eluted from the resin with water, made alkaline with 0.1 N sodium hydroxide solution to pH 6.5 to obtain trisodium zinc diethylenetriaminepentaacetate having a molecular weight of 522.

*Example 13*

Operations are carried out in a similar manner as follows:

(*a*) Disodium nickelous ethylenediaminetetraacetate by exchanging nickelous chloride on Amberlite IR–100 (a phenolic methylene sulfonic resin) followed by heating the resulting resin with aqueous tetrasodium ethylenediaminetetraacetate solution, thereafter eluting the chelate from the resin with water and evaporating the effluent to dryness.

(*b*) Sodium cobaltic N-(2-hydroxyethyl)ethylenediaminetriacetate by exchanging cobaltous sulfate on Zeo-Karb (a sulfonated coal, cation exchanger) followed by heating the resulting resin with trisodium N-(2-hydroxyethyl)ethylenediaminetriacetate solution, thereafter eluting the air-oxidized chelate from the resin with water and evaporating the effluent to dryness.

(*c*) Zinc iminodiacetate by exchanging zinc chloride on Wofatit P (a reaction product of phenol, formaldehyde and sodium sulfite which is then treated with sulfuric acid) followed by heating the resulting resin with an aqueous solution of disodium iminodiacetate, thereafter eluting the chelate from the resin with water and evaporating the effluent to dryness.

The products of the present invention are useful for supplying chelatable metals for slow or controlled release in numerous industrial and agricultural applications. Thus, the compounds may be employed to supply micronutrients to plants. It has been found that when the compounds prepared according to the methods of the present invention are employed in compositions suitable for foliar spray applications and sprayed on plants, the compositions are found to be substantially freed of the impurities causing leaf burn, leaf spotting and other toxic symptoms. Thus, in a representative example, a commercial sodium ferric N-(2-hydroxyethyl)ethylenediaminetriacetate containing 9% iron and sodium ferric N-(2-hydroxyethyl)ethylenediaminetriacetate prepared as described in Example 1 containing 14.56% iron were employed to prepare treating compositions containing 4 pounds of the chelate in 100 gallons of ultimate dispersion. These treating compositions were sprayed on tomato plants about 6 inches tall, wetting the plants to the point of run-off. The plants were then placed in a greenhouse and observed after 2–3 weeks. It was found that 60% of the plants sprayed with the commercial sodium ferric N-(2-hydroxyethyl)ethylenediaminetriacetate had been killed or injured whereas only 15% of the plants sprayed with the chelate prepared according to the present invention suffered any injury. In further operations, the chelate prepared according to the methods of the present invention was employed in treating compositions adjusted so that the iron content was the same 9% as in the commercial chelate. Thus, treating compositions were compared directly on the basis of iron content. The results obtained were as follows:

| Treating Composition prepared from— | Percent Kill of Plants—Concentration of Treating Compositions in Pounds per 100 Gallons | | | |
|---|---|---|---|---|
| | 4 | 6 | 8 | 10 |
| Commercial Chelate | 60 | 75 | 95 | 98 |
| Applicant's Chelate | 0 | 10 | 5 | 10 |

I claim:

1. An improved method for producing metal chelates of amoniopolycarboxylic acid compounds which consists essentially of
   (1) mixing together and agitating an up to about 0.25 molar aqueous solution of a salt of a chelatable metal and a sulfonic acid cation exchange resin to exchange on said resin the chelatable metal cation,
   (2) mixing in a batch process at temperatures up to 100° C. said chelatable metal bearing cation exchange resin with an aminopolycarboxylic acid chelating agent in an amount substantially stoichiometric with the amount of chelatable metal salt employed in an aqueous solution containing at least 10 percent by weight of the chelating agent for about from 1 to 4 hours to produce a metal chelate of said aminopolycarboxylic acid compound, and
   (3) separating the resin retaining said chelate from the reaction mixture and washing the resin with water to elute the desired metal chelate of aminopolycarboxylic acid compound therefrom and to recover same in the aqueous effluent.

2. An improved method for producing metal chelates of aminopolycarboxylic acid compounds which consists essentially of
   (1) passing an up to about 0.25 molar aqueous solution of a salt of a chelatable metal through a column containing a sulfonic acid cation exchange resin to exchange thereon the chelatable metal cation, (2) mixing in a batch process at temperatures up to 100° C. the resulting resin bearing said chelatable metal cation with an aminopolycarboxylic acid chelating agent in an amount substantially stoichiometric with the amount of chelatable metal salt employed in an aqueous solution containing at least 10 percent by weight of the chelating agent for about from 1 to 4 hours to produce a metal chelate of said aminopolycarboxylic acid compound, (3) separating the resin retaining said chelate from the reaction mixture and washing the resin with water to elute the desired metal chelate of said aminopolycarboxylic acid compound therefrom and to recover the same in the aqueous effluent.

3. An improved method for producing a ferric chelate of N-(2-hydroxyethyl)ethylenediaminetriacetic acid compound which consists essentially of contacting an up to about 0.25 molar aqueous solution of a ferric salt with a sulfonic acid cation exchange resin to exchange thereon ferric ion, mixing in a batch process at temperatures up to 100° C. the resin bearing ferric ion with an N-(2-hydroxyethyl)ethylenediaminetriacetic acid chelating agent in an amount substantially stoichiometric with the amount of ferric salt employed in an aqueous solution containing at least 10 percent by weight of the chelating agent for about from 1 to 4 hours to produce a ferric chelate of said N-(2-hydroxyethyl)ethylenediaminetriacetic acid compound, thereafter separating the resin retaining said chelate from the reaction mixture and washing the resin with water to elute the desired ferric chelate of N-(2-hydroxyethyl)ethylenediaminetriacetic acid compound therefrom and to recover the same in the aqueous effluent.

4. An improved method for producing a ferric chelate of ethylenediaminetetraacetic acid compound which consists essentially of contacting an up to about 0.25 molar aqueous solution of a ferric salt with a sulfonic acid cation exchange resin to exchange thereon ferric ion, mixing in a batch process at temperatures up to 100° C. the resin bearing said ferric ion with an ethylenediaminetetraacetic acid chelating agent in an amount substantially stoichiometric with the amount of ferric salt employed in an aqueous solution containing at least 10 percent by weight of the chelating agent and maintaining the mixture at a temperature of from about 15° C. to about 100° C. for about from 1 to 4 hours to produce a ferric chelate of said ethylenediaminetetraacetic acid compound, thereafter separating the resin retaining said chelate from the reaction mixture and washing the resin with water to elute the desired ferric chelate of ethylenediaminetetraacetic acid compound therefrom and to recover the same in the aqueous effluent.

5. An improved method for producing a ferric chelate of diethylenetriaminepentaacetic acid compound which consists essentially of contacting an up to about 0.25 molar aqueous solution of a ferric salt with a sulfonic acid cation exchange resin to exchange thereon ferric ion, mixing in a batch process at temperatures up to 100° C. the resin bearing said ferric ion with a diethylenetriaminepentaacetic acid chelating agent in an amount substantially stoichiometric with the amount of ferric salt employed in an aqueous solution containing at least 10 percent by weight of the chelating agent for a period of about from 1 to 4 hours to produce a ferric chelate of diethylenetriaminepentaacetic acid compound, thereafter separating the resin retaining said chelate from the reaction mixture and washing the resin with water to elute the desired ferric chelate of diethylenetriaminepentaacetic acid compound therefrom and to recover the same in the aqueous effluent.

References Cited in the file of this patent
UNITED STATES PATENTS

| | | |
|---|---|---|
| 2,798,789 | Spedding et al. | July 9, 1957 |
| 3,008,974 | Frimodig | Nov. 14, 1961 |